No. 867,923. PATENTED OCT. 8, 1907.
T. G. MORSE.
TAPPING MECHANISM.
APPLICATION FILED JUNE 19, 1906.
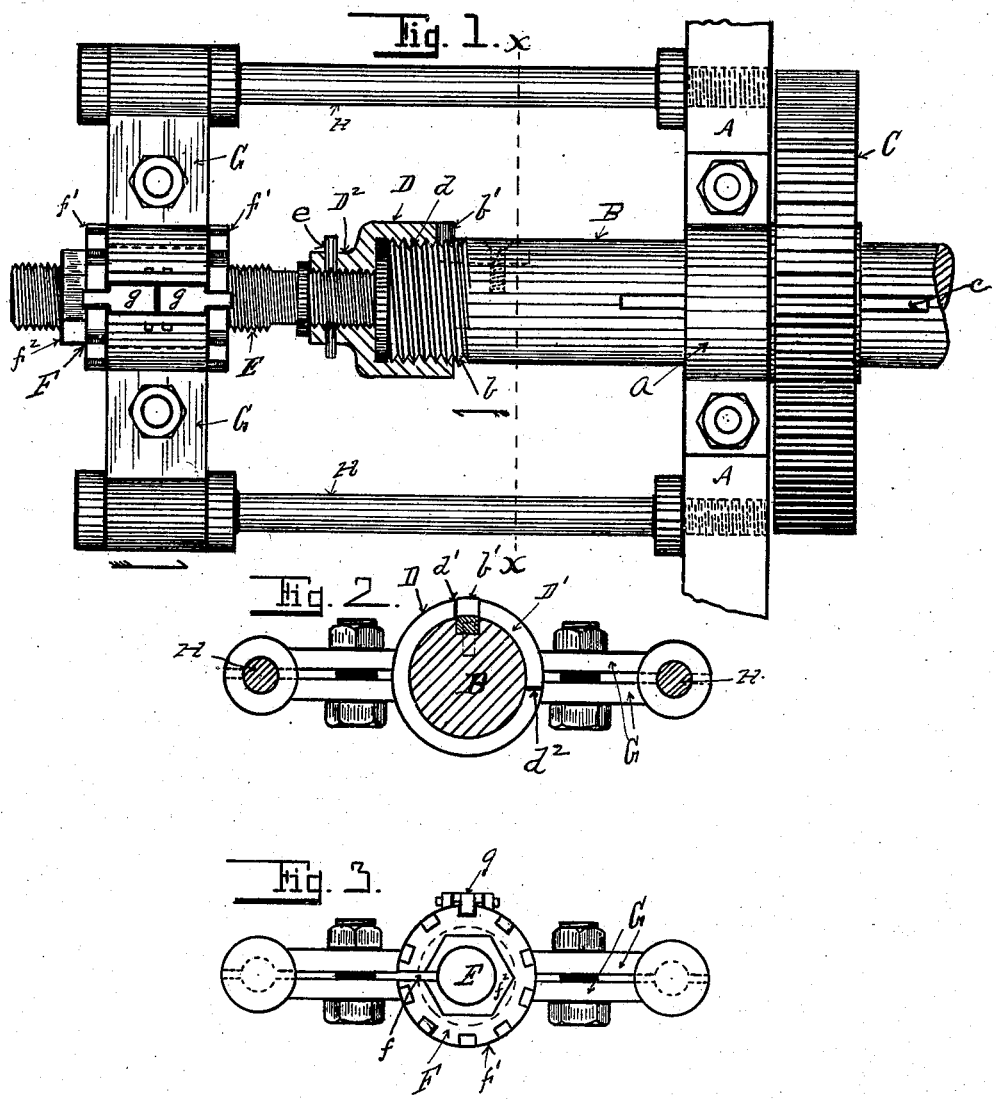
Witnesses.
Berry A. Sturgeon
Florence Stockert.
Inventor.
Thomas G. Morse
By J.C. & H. M. Sturgeon
attys.

UNITED STATES PATENT OFFICE.

THOMAS G. MORSE, OF ERIE, PENNSYLVANIA, ASSIGNOR TO MORSE IRON WORKS, OF ERIE, PENNSYLVANIA, A CORPORATION OF PENNSYLVANIA.

TAPPING MECHANISM.

No. 867,923.  Specification of Letters Patent.  Patented Oct. 8, 1907.

Application filed June 19, 1906. Serial No. 322,436.

*To all whom it may concern:*

Be it known that I, THOMAS G. MORSE, a citizen of the United States, residing at Erie, in the county of Erie and State of Pennsylvania, have invented certain new and useful Improvements in Tapping Mechanism; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to tapping mechanism, and particularly tapping mechanism for tapping fittings and work of like character.

In the operation of tapping machines there is considerable stress or strain exercised between the guide screw and the tap as the tap starts to cut the first thread or threads as it enters the fitting to be threaded, and this stress or strain is particularly strong when the tap used in threading the fitting becomes dulled from use, and the effect or result of this longitudinal stress or strain between the guide-screw and the tap frequently causes the tap to injure the first thread or threads of the fitting as the tap is withdrawn by the reverse action of the tapping mechanism. To overcome this difficulty I have provided a comparatively loose screw thread joint between the guide-screw and tap spindle, which joint unscrews slightly as the tap moves toward the fitting, so that the distance between the guide-screw and the point of the tap is slightly lengthened at the time the tap engages the fitting, and continues in this lengthened condition until the thread in the fitting is completed, and when the mechanism reverses to withdraw the tap from the fitting it operates to screw the screw-joint up, so as to slightly shorten the distance between the guide-screw and the tap, and thus relieve the longitudinal stress or strain existing between the guide-screw and the tap, and allows the tap to be withdrawn from the finished fitting free from any longitudinal stress or strain.

The features of my invention are hereinafter fully set forth and described, and illustrated in the accompanying drawings in which:

Figure 1 is a plan view of a portion of a tapping machine. Fig. 2 is a transverse section of the same in the line $x-x$ in Fig. 1. Fig. 3, is an end view of the same.

In these drawings A is a portion of a tapping machine frame, and $a$ is a tap-spindle bearing thereon. B is a section of a tap-spindle mounted in said bearing; the remainder of the spindle and tap operating therein (not shown), being of the usual and ordinary construction.

C is a spur gear for driving the spindle B and is connected therewith by an ordinary spline and groove $c$ in the usual manner.

On the end of the spindle B, I provide a cap D provided with an internal screw thread $d$, which engages a screw thread $b$ on the spindle B. The inner end of this cap D is cut away at $D'$, so as to form shoulders $d' d^2$, and to the spindle B, I secure a stop $b'$ adapted to engage the shoulders $d' d^2$ as the spindle B is rotated in one direction or the other in the cap D. On the outer end of the cap D, I provide a screw threaded sleeve $D^2$ to receive the end of a guide-screw E which is secured from rotation therein by means of a pin $e$. This guide-screw E passes through an adjusting nut F which is provided with a slit $f$ so that the nut F can be compressed upon the guide-screw E. This adjusting nut F is provided with notched collars $f' f'$ at each end thereof, and with a squared portion $f^2$ by means of which it can be rotated. This nut F is mounted in a clamping mechanism G which communicates with the frame A by means of rods H H, so as to retain the nut F in a fixed position with relation to the frame A, and on this clamping mechanism G there are hinged stops $g g$ adapted to engage the notches in the collars $f'$ and prevent the rotation of the nut F in the clamping mechanism G.

In operation when the spindle B is rotated to tap a thread, the friction of the adjusting nut F on the guide-screw E operates to rotate the spindle B in the cap D until the stop $b'$ engages with the shoulder $d'$ after which the guide-screw E rotates in unison therewith until the thread in the fitting being tapped is completed, when, however, the mechanism is reversed to withdraw the tap, the spindle B again rotates in the cap D until the stop $b'$ engages the shoulder $d^2$ thereon, when the guide-screw and spindle again rotate in unison until the tap is completely withdrawn from the fitting.

Having thus shown and described convenient mechanism for utilizing my invention, so as to enable others to utilize the same; what I claim as new and desire to secure by Letters-Patent of the United States is:

1. In a tapping machine the combination of, a tap-spindle, a guide-screw operating through a longitudinally fixed nut and operatively connected to the inner end of the tap-spindle so as to allow of a limited degree of rotation of one upon the other, and means between them whereby the rotation of one upon the other will produce relative longitudinal movement of the tap-spindle, substantially as and for the purpose set forth.

2. In a tapping machine the combination of, a tap-spindle, a guide-screw operatively jointed to the end of the tap-spindle, a longitudinally fixed non-rotatable nut on the guide-screw, a screw joint producing a limited longitudinal movement between the guide-screw and the inner end of the tap-spindle operating to slightly shorten the combined length of the tap-spindle and guide-screw as it starts forward to tap a thread, and slightly increase such combined length as the tap starts to retreat from the thread tapped and means to limit the action of said screw joint, substantially as set forth.

3. In a tapping mechanism, the combination of a tap-spindle, a guide-screw, a longitudinally fixed guide-screw nut, a screw cap secured to the guide-screw engaging a screw-thread on the end of the tap-spindle, shoulders on said cap, and a stop on the tap-spindle engaging said shoulders so as to limit its rotation on said tap-spindle, substantially as and for the purpose set forth.

In testimony whereof I affix my signature, in presence of two witnesses.

THOMAS G. MORSE.

Witnesses:
P. V. GIFFORD,
H. M. STURGEON.